United States Patent [19]
Lyman, Jr.

[11] 4,132,113
[45] Jan. 2, 1979

[54] NAVIGATION DEVICES

[75] Inventor: Harold T. Lyman, Jr., Milford, Conn.

[73] Assignee: Questech, Inc., Hamden, Conn.; a part interest

[21] Appl. No.: 769,409

[22] Filed: Feb. 16, 1977

[51] Int. Cl.² ............................................. G01C 21/00
[52] U.S. Cl. ................................................. 73/178 R
[58] Field of Search ............. 73/178 R, 178 T, 178 H; 235/150.27, 150.26, 150.2, 150.5; 250/235 SE, 211 R, 233, 237; 33/363 K, 328, 363 R

[56] References Cited
U.S. PATENT DOCUMENTS

| | | | |
|---|---|---|---|
| 3,875,405 | 4/1975 | Ferguson | 250/231 SE |
| 4,023,018 | 5/1977 | Hall | 33/363 K |

Primary Examiner—Donald O. Woodiel

[57] ABSTRACT

A navigational device consisting of a magnetic compass containing a pattern having a specified relation of black-to-white density with respect to angle, rotating with the compass card, a light source for illumination of the pattern, pairs of sensors mounted in the compass and responsive to the light intensity reflected from or transmitted through the pattern, the output from one pair of sensors being proportional to the sine of the angle made by the sensor pair zero reference line with respect to Magnetic North, and the output of the other pair of sensors being proportional to the cosine of said angle, both outputs being suitable for operation of a remote indicating compass, and various modifications thereof for making the outputs of the sensor pairs proportional to the sine and cosine of the angle between a manually settable desired heading or angle and the angle of the said sensor pair zero reference line with respect to Magnetic North. Several additional features such as off-course alarm, drift vector insertion, and compensating means for craft pitch and roll are described and claimed.

23 Claims, 24 Drawing Figures

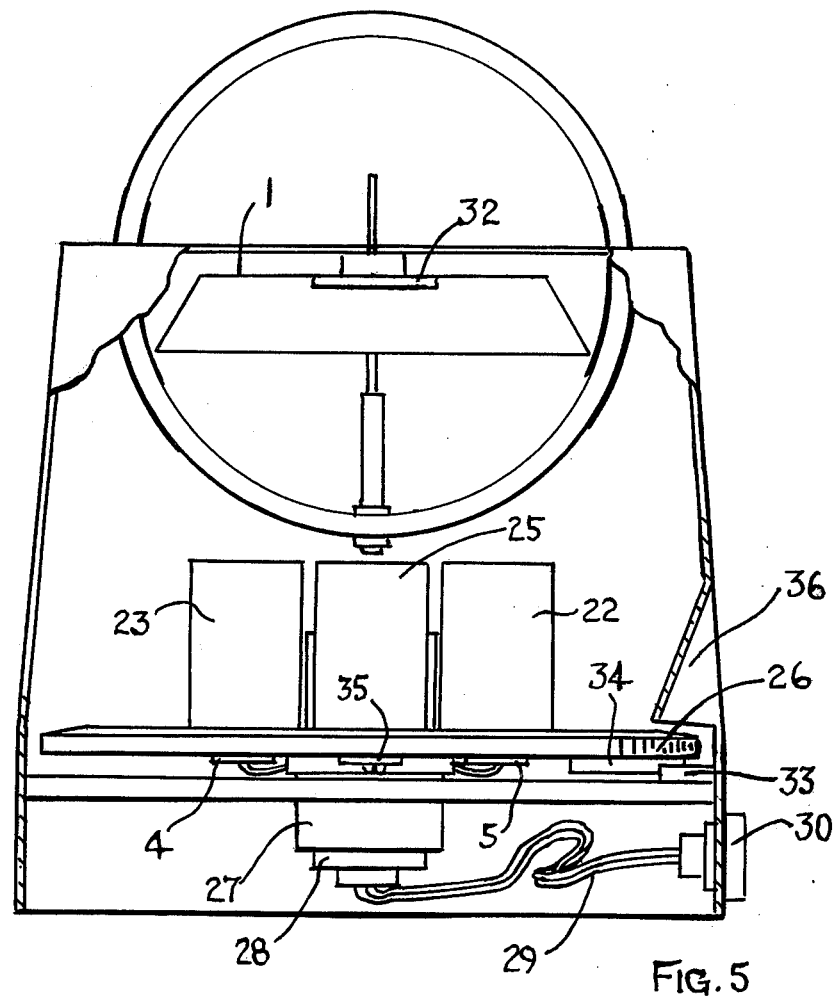
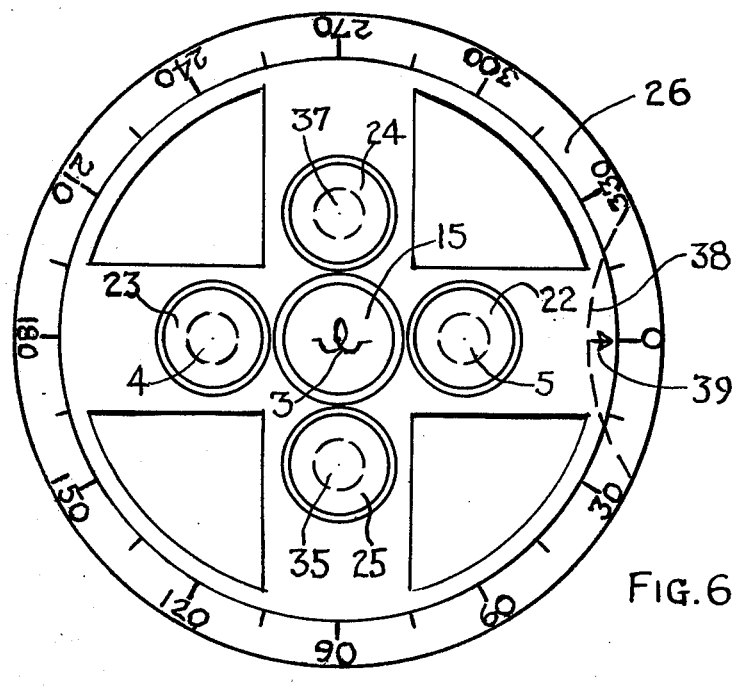

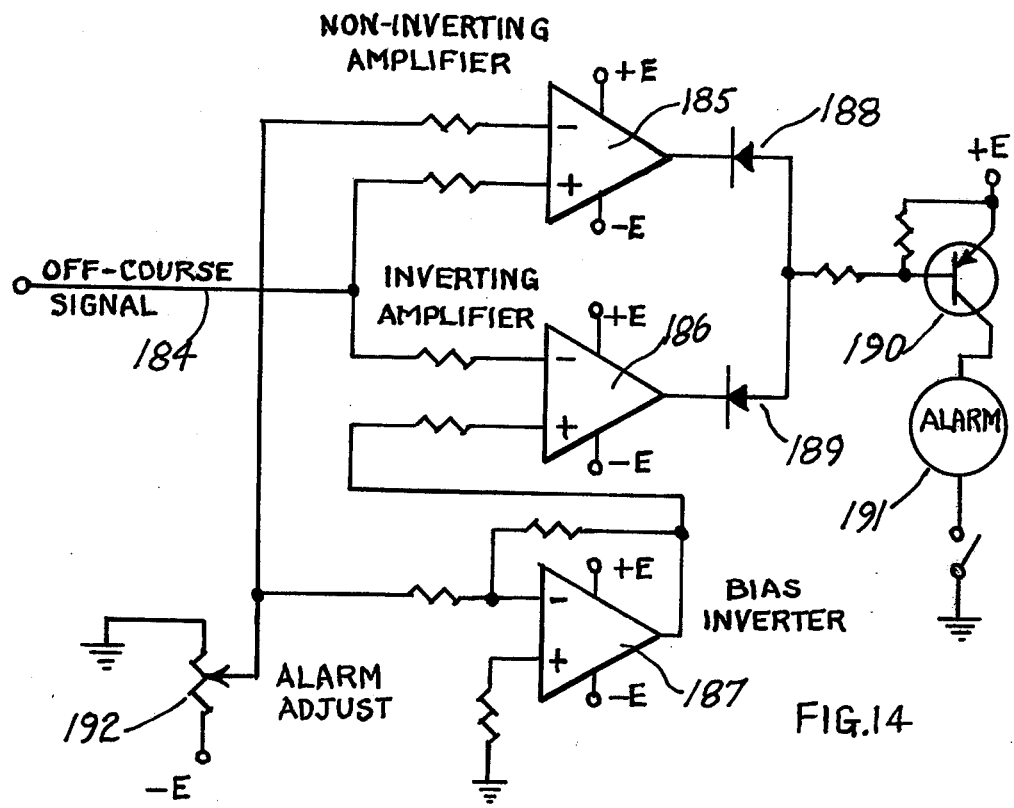
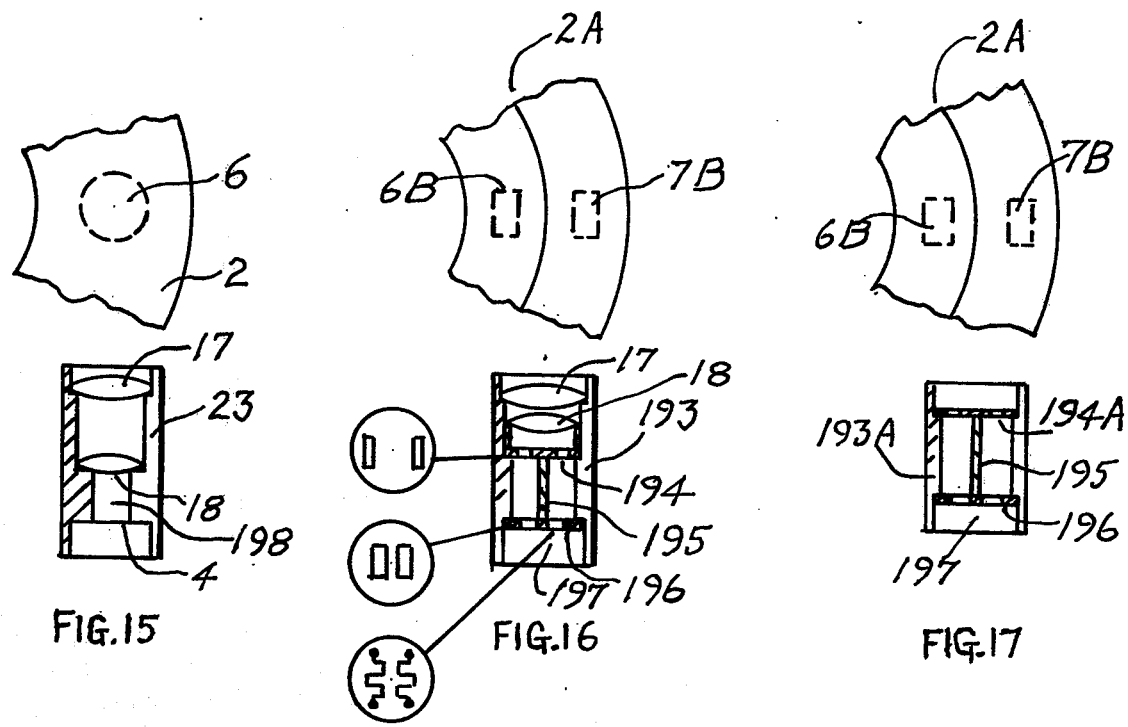

NAVIGATION DEVICES

This invention relates to navigational devices, and more particularly to distance-computing and steering angle display devices utilized in navigation.

The principal object of the invention is the automatic computation and display, by simple and novel means, of a craft's coordinates with respect to a preselected starting point and course, the latter also being designated as the desired heading in the following description.

Another object is the display of actual steering angle of the craft with respect to the desired heading, the signals for the display being generated by the above said means in a magnetic compass.

A further object is the injection of an estimated drift vector into the craft's coordinate computation.

A still further object is the remote display of the signal-generating compass card angle with respect to magnetic North.

Another object is the incorporation of a continuous trimming adjustment for zero error at all course angles and at normal angles of craft pitch and roll.

A final object is the provision of a signal suitable for control of an automatic pilot.

The objects and advantages of the invention will appear from the following description, taken with the accompanying drawings, in which.

Figure 4:
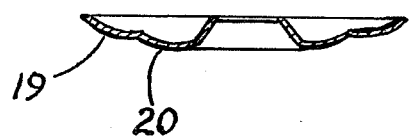

A cross-section of a typical split pattern is shown in FIG. 4, the contour being shaped to compensate optically for card tilt occurring due to craft pitch and roll. This will be explained in more detail in the following description. The compensated contour of a pattern which is not split is shown in the sectional view of FIG. 1.

FIG. 5 shows a compass in which the sensors and pattern are single, and the sensors are mounted on a ring which may be designated as the desired heading dial. The function of this dial will be explained in detail later. FIG. 5 is an elevation view taken through a partial housing section.

FIG. 6 is a plan view of the sensor optics mounted on the desired heading ring. The illuminating lamp is shown, also.

Figure 7:
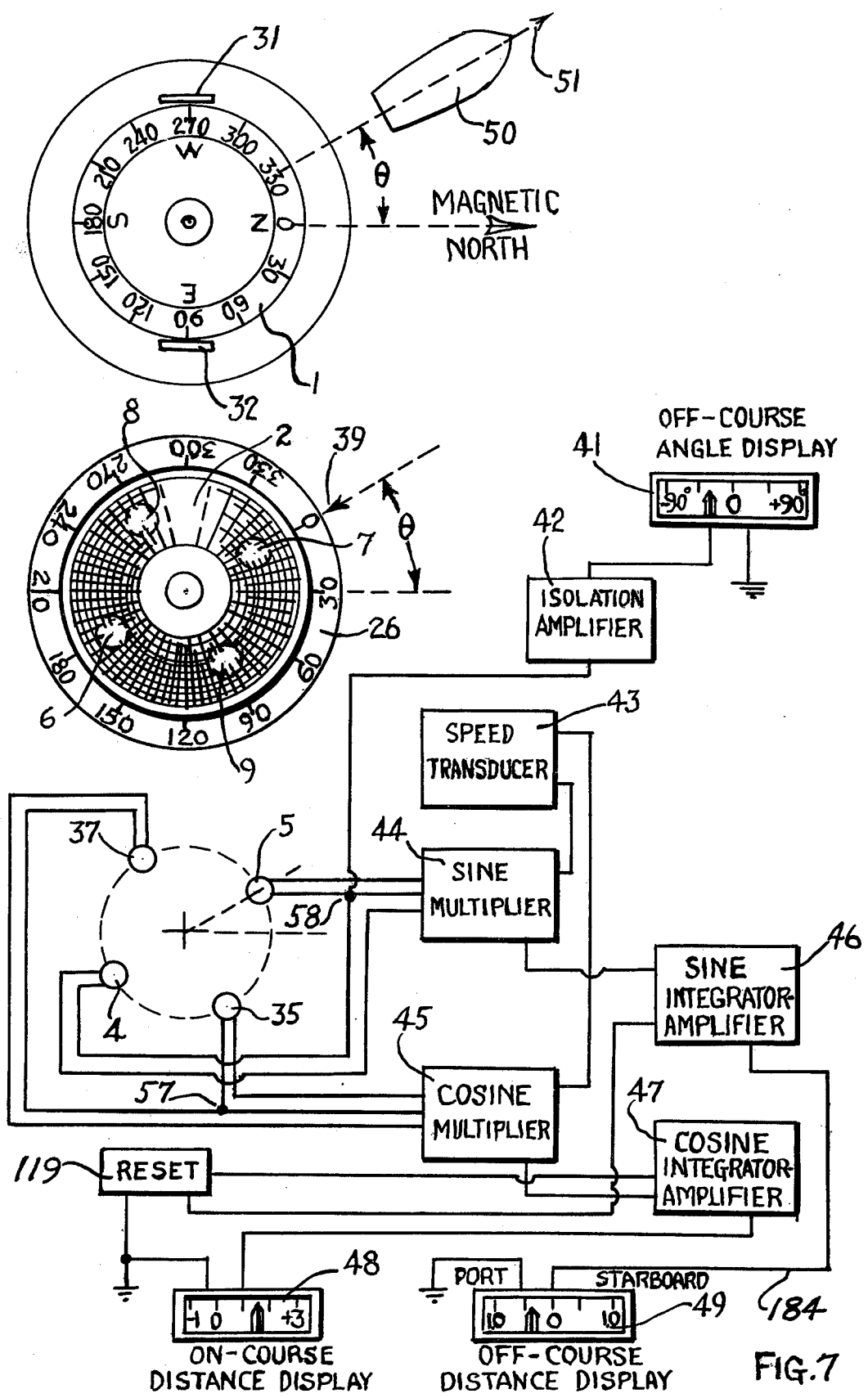

FIG. 7 is a block diagram of the entire compass, course computer and output display system.

Figure 8:
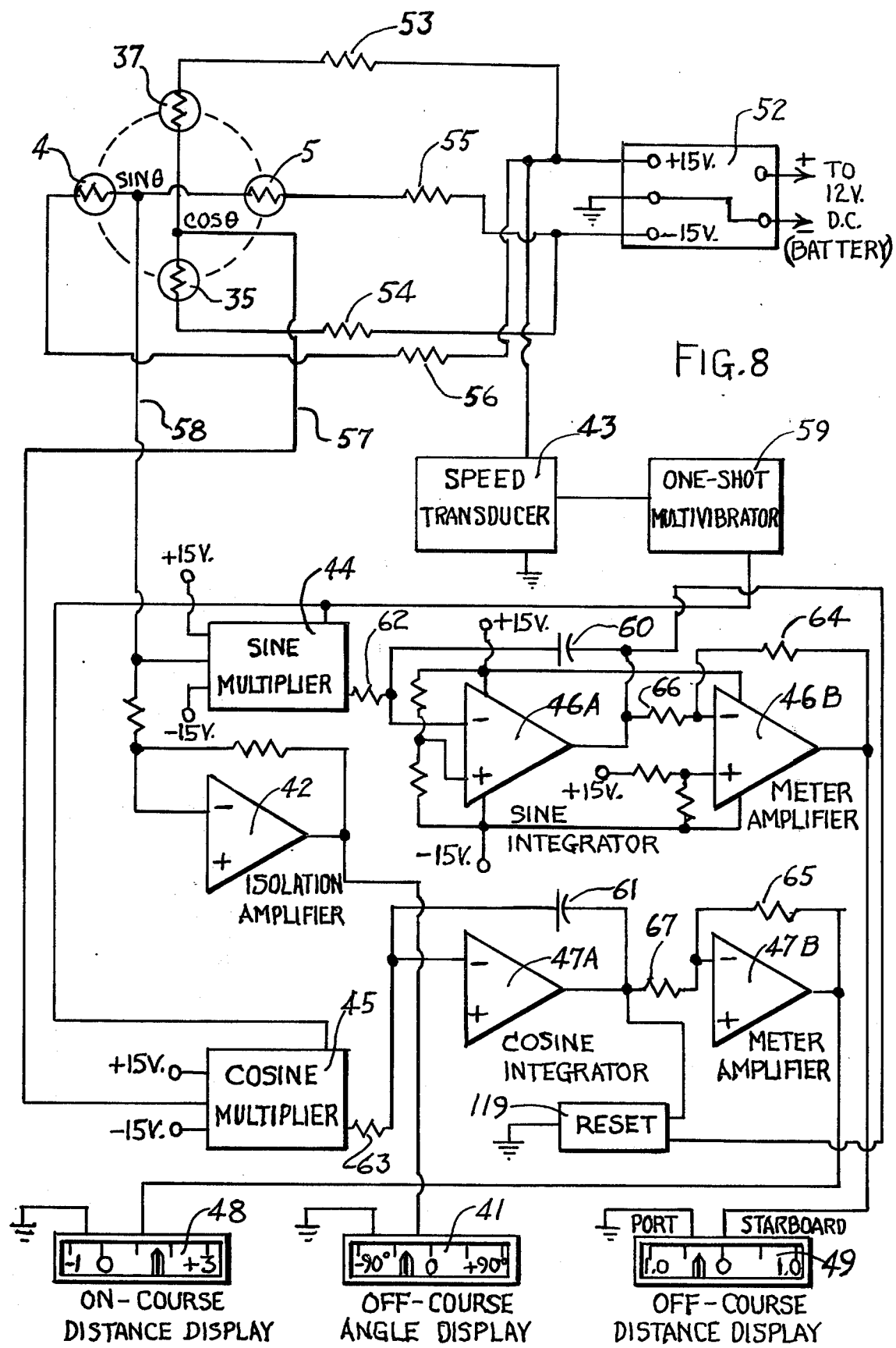

FIG. 8 is a more detailed schematic of the same system.

Figure 9:
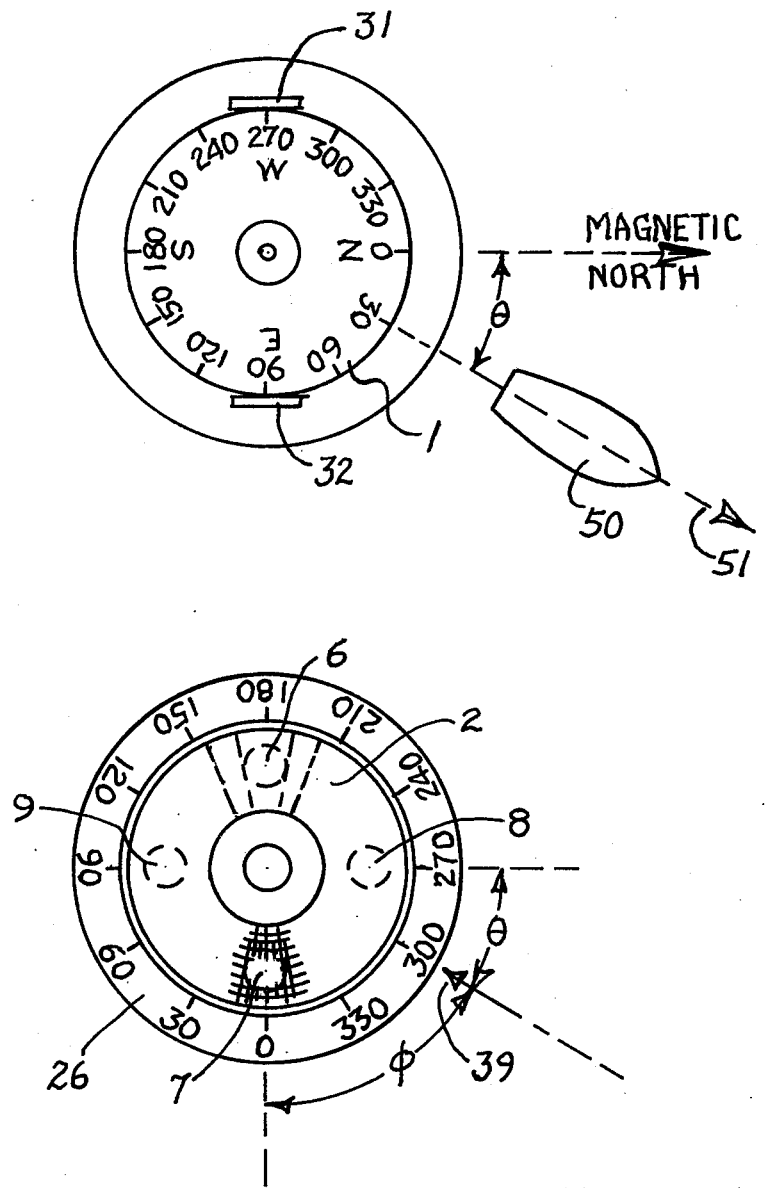

FIG. 9 shows the angular relations of the craft, the compass, the pattern and sensors, and the desired heading ring.

Figure 10:
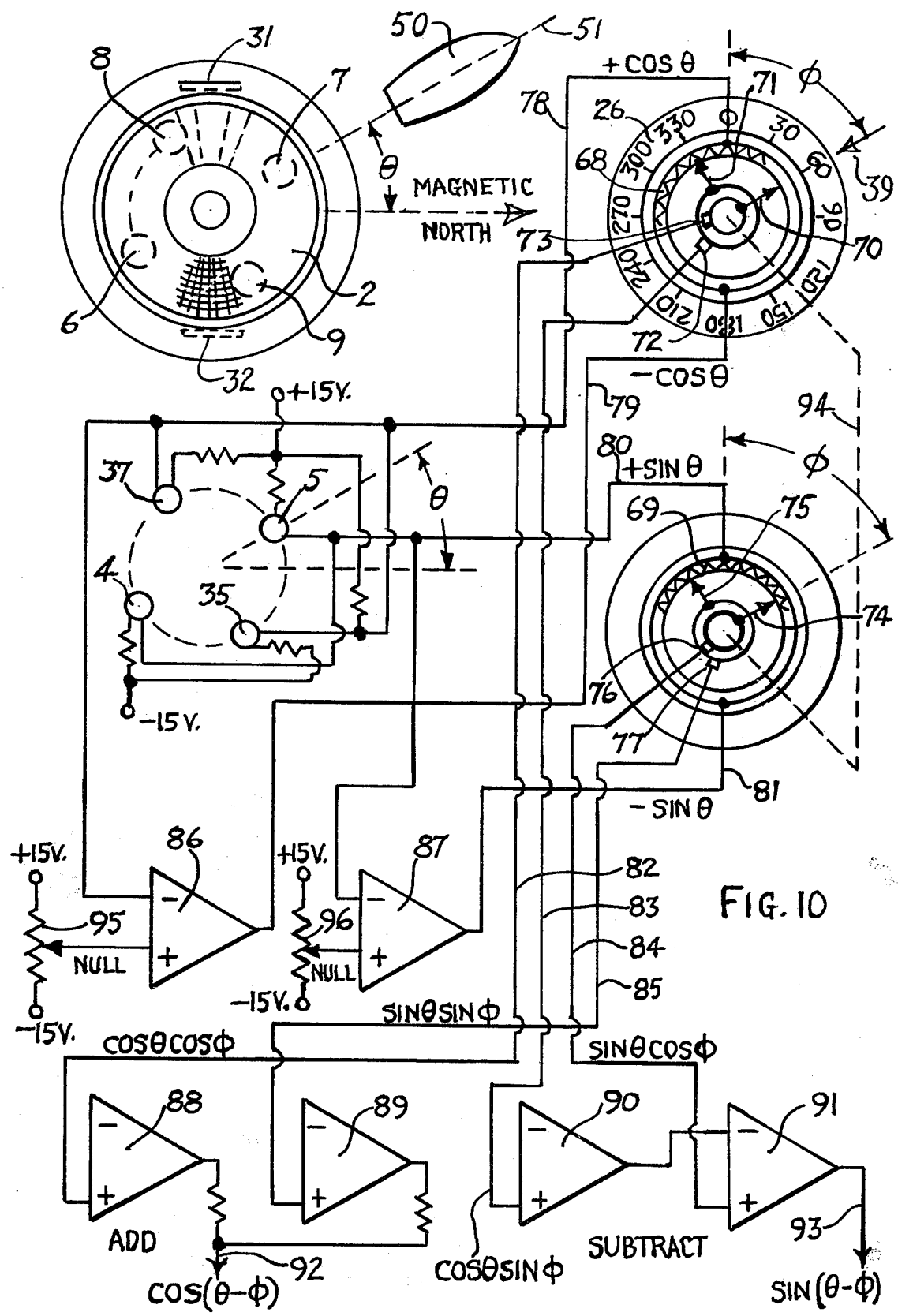

FIG. 10 shows a modified system in which the desired heading ring is a dial on the shaft of a sine-cosine potentiometer and illustrates the extraction of the sine and cosine of the difference angle $(\theta - \phi)$ between the craft's actual heading $\theta$ and the desired heading $\phi$.

Figure 11:
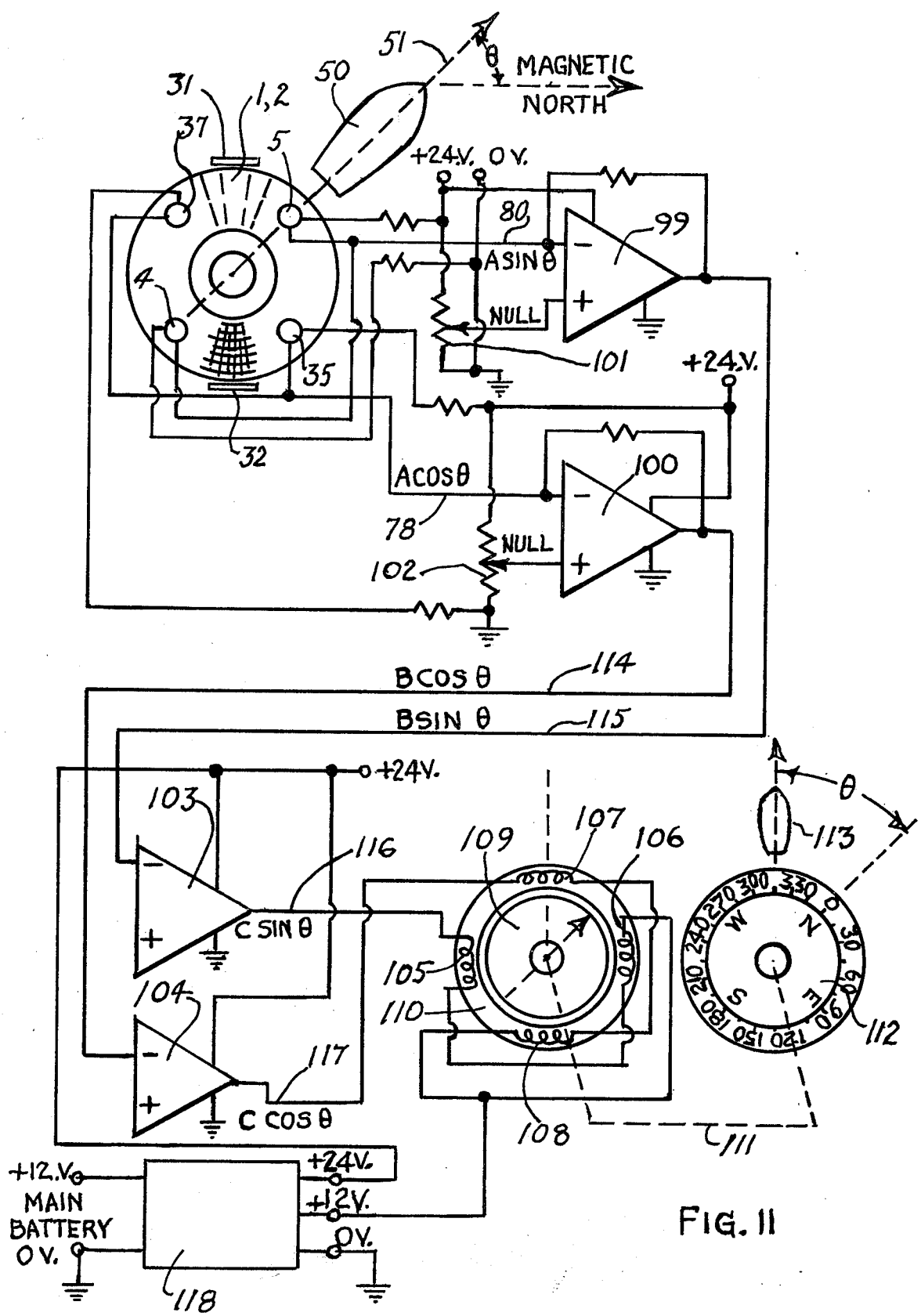

FIG. 11 shows the application of the compass readout signals to the control of a remote indicating dial.

Figure 12:
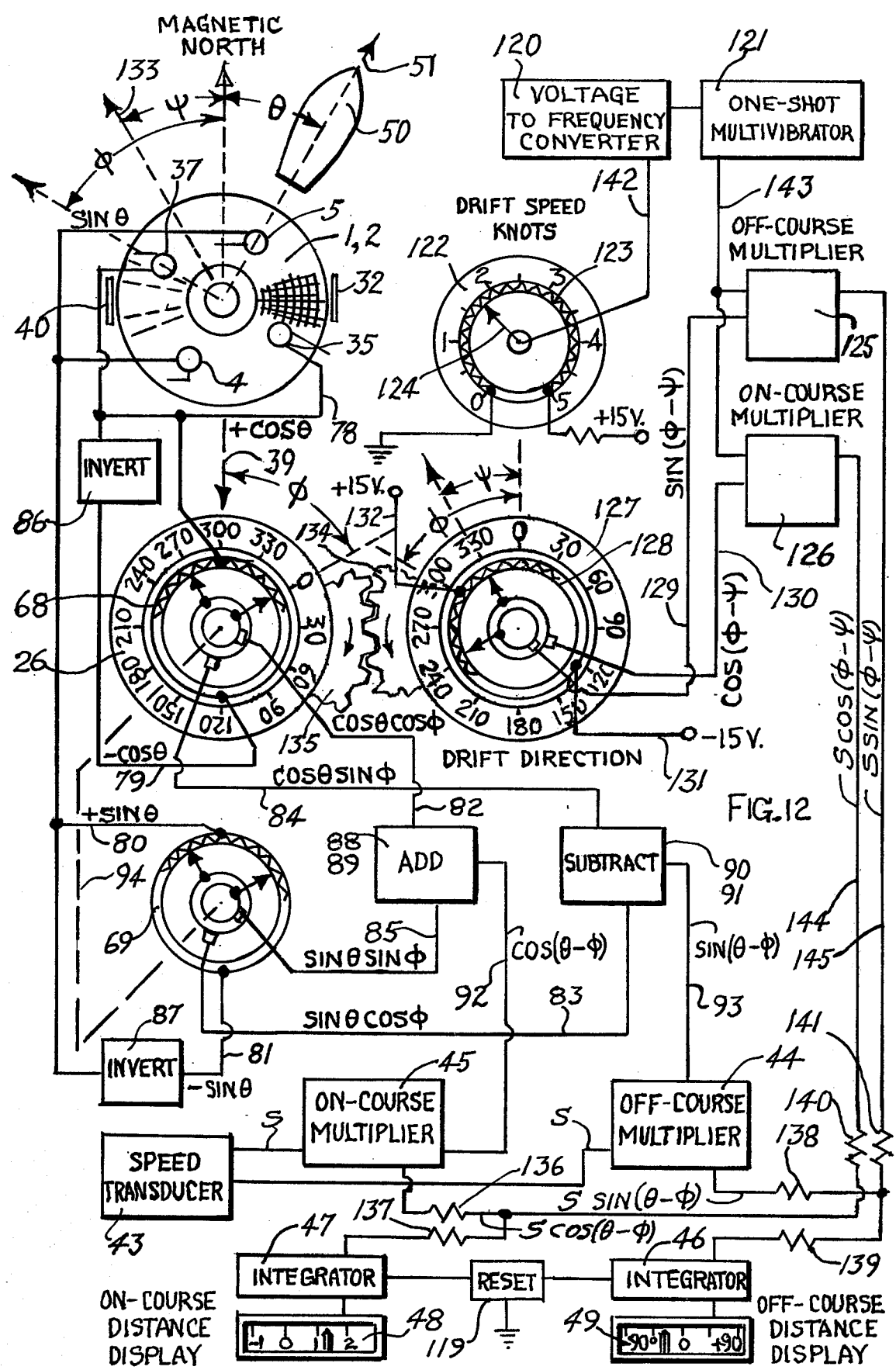

FIG. 12 is a block diagram of the means of insertion of an estimated drift vector into the automatic computation and display of the craft's coordinates.

Figure 13:
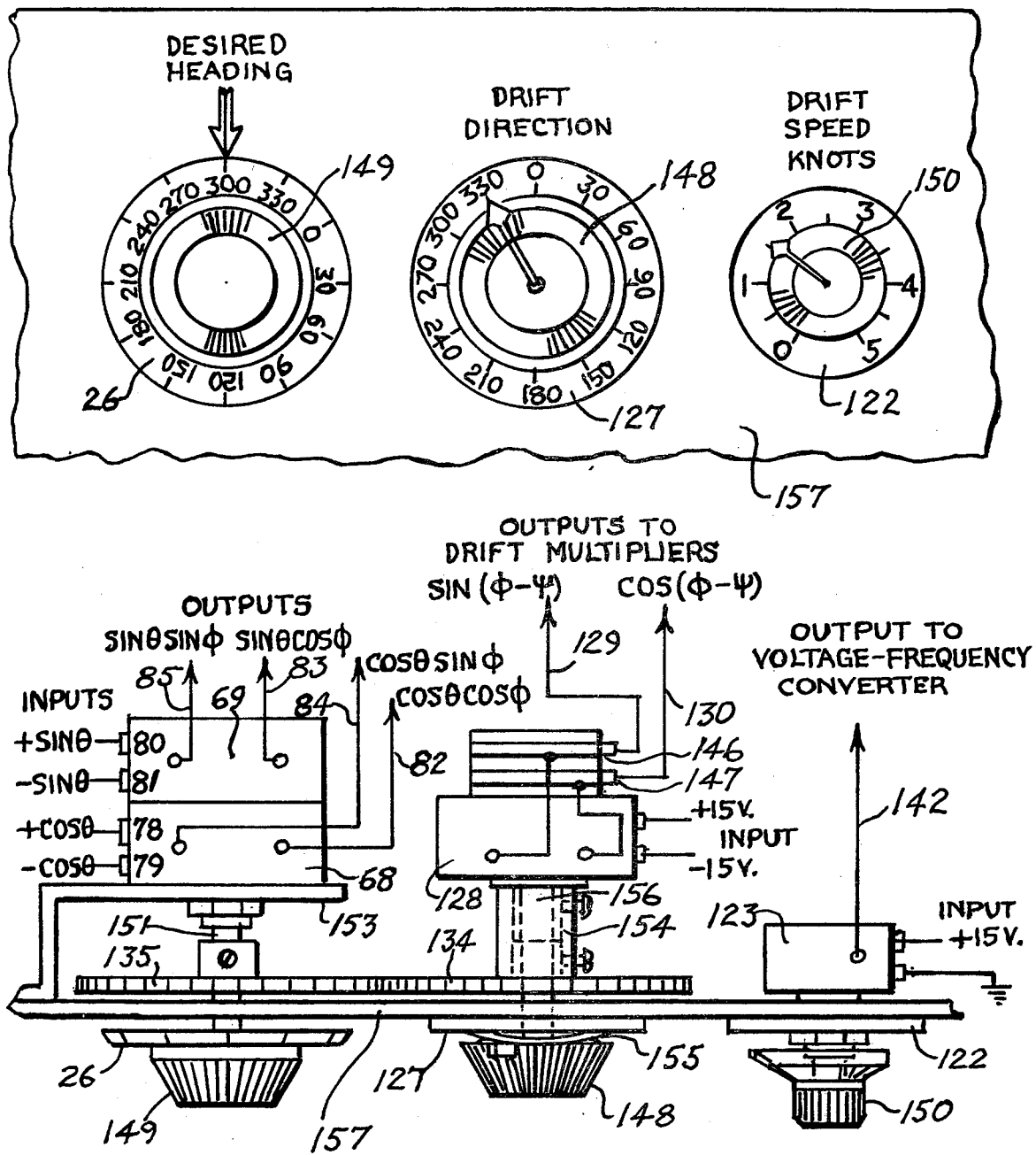

FIG. 13 shows the panel appearance and a plan view of the potentiometers and gears involved in the drift vector insertion.

FIG. 14 is a circuit diagram of an adjustable off-course alarm system.

Figure 1:
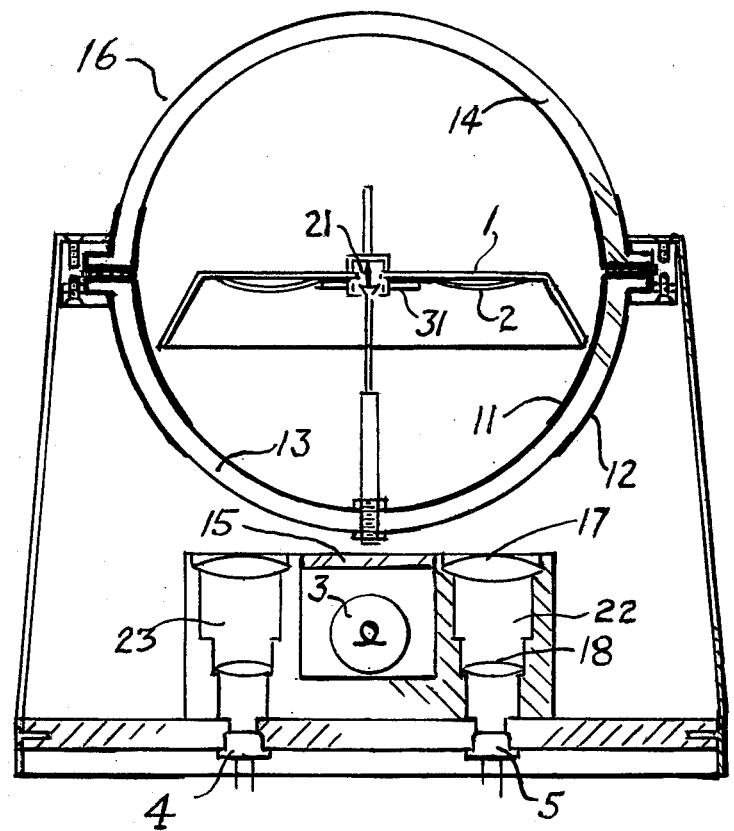
FIG. 1 shows a magnetic compass having a rotatable card on the underside of which is a variable density pattern illuminated from below and which is viewed by two pairs of photo-sensors, the sensors being focussed on specific areas of the pattern by lenses, the sensors in this case being fixed in position.

FIG. 15 shows the sensor and optics holder involved in the single pattern system of FIG. 1.

Figure 3:
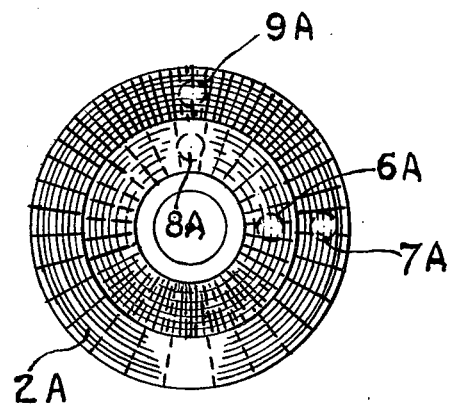
FIG. 3 shows a modification of the card pattern in which the inner and outer halves of the pattern are split and are displaced angularly by 180°, and a modification of the sensors such that a dual sensor replaces each pair of the sensors of FIG. 1. This has certain advantages which will become apparent in the description.

FIG. 16 shows the dual sensor and optics holder utilized in the split pattern system of FIG. 3.

FIG. 17 shows the lensless aperture optics which may be employed if the sensor and optics are relatively close to the pattern and are immersed in the compass oil.

Figure 18:
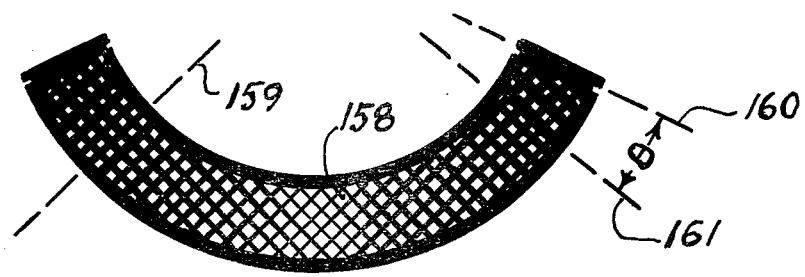

FIG. 18 shows a developed view of a density pattern used as a light transmission control, rather than a light reflection control as in the previous figures.

Figure 19:
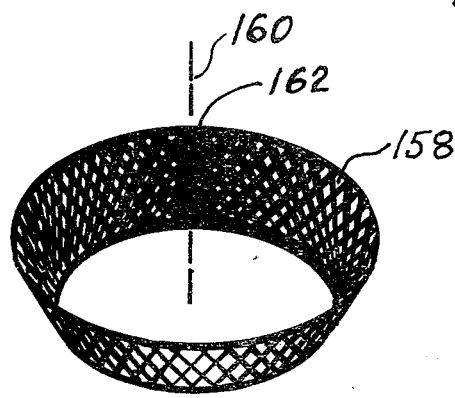

FIG. 19 illustrates the joining of the ends of the transmissive pattern so as to form a cone.

Figure 20:
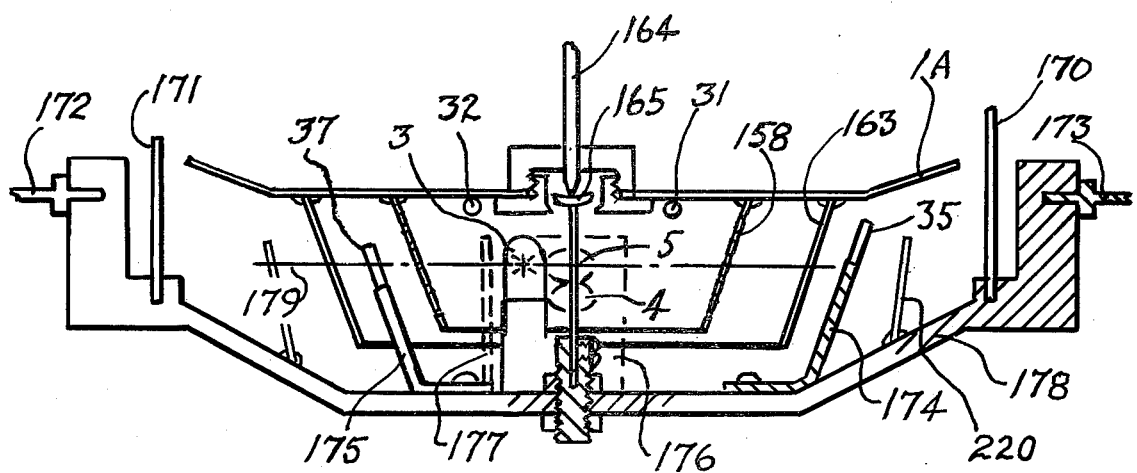

FIG. 20 shows the assembly of the compass card, the pattern cone and a transmissive trimming cone, and the general relations of the light source, sensors and cones.

Figure 21:
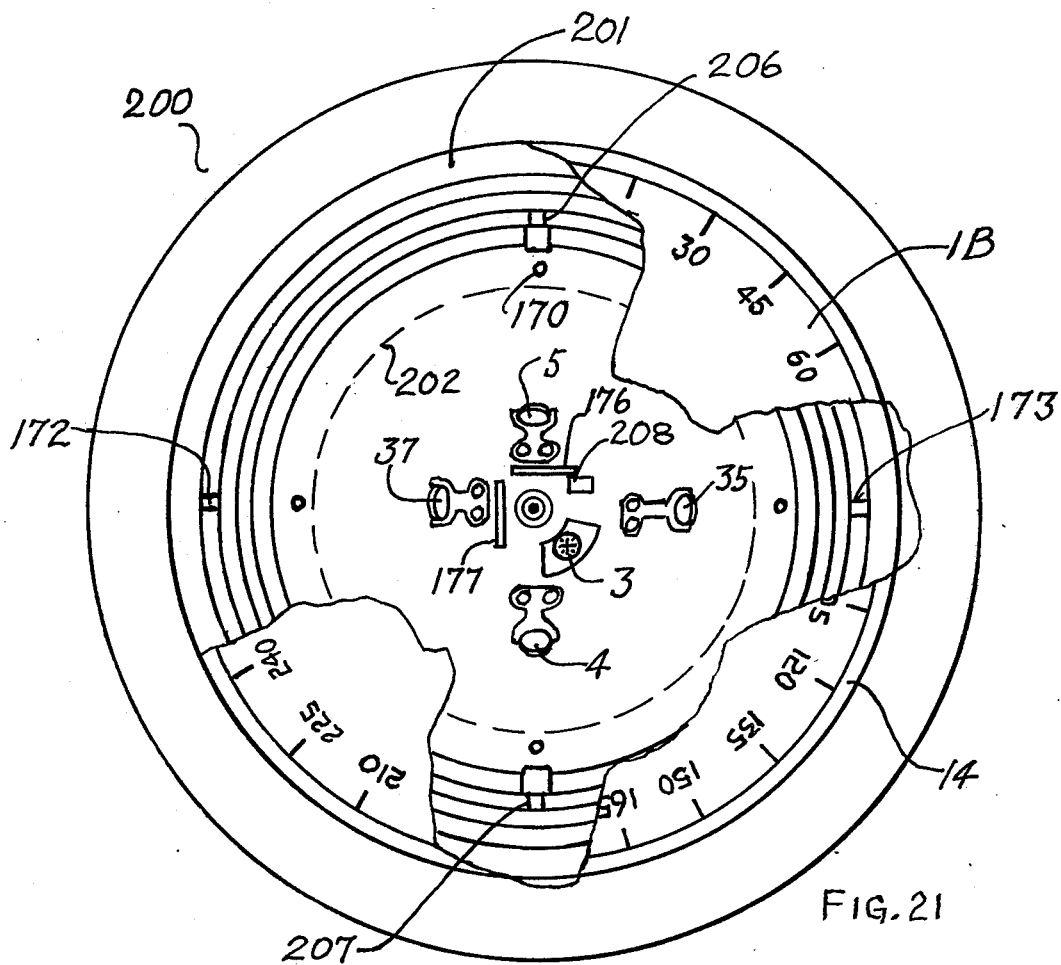

FIG. 21 is a cut-away plan of the lamp, sensors and lamp regulator sensor as mounted on the gimballed compass tray.

Figure 22:
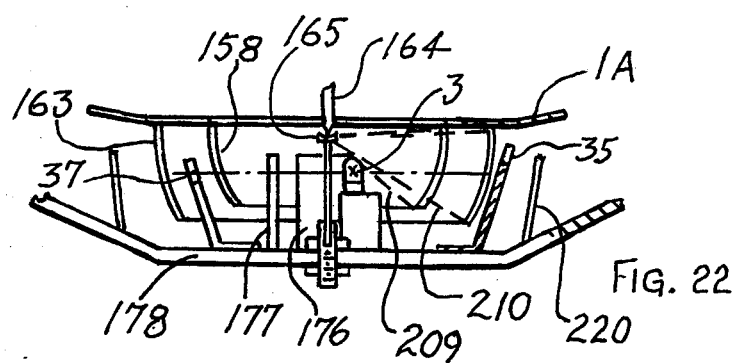

FIG. 22 shows a means of compensation for card tilt.

Figure 23:
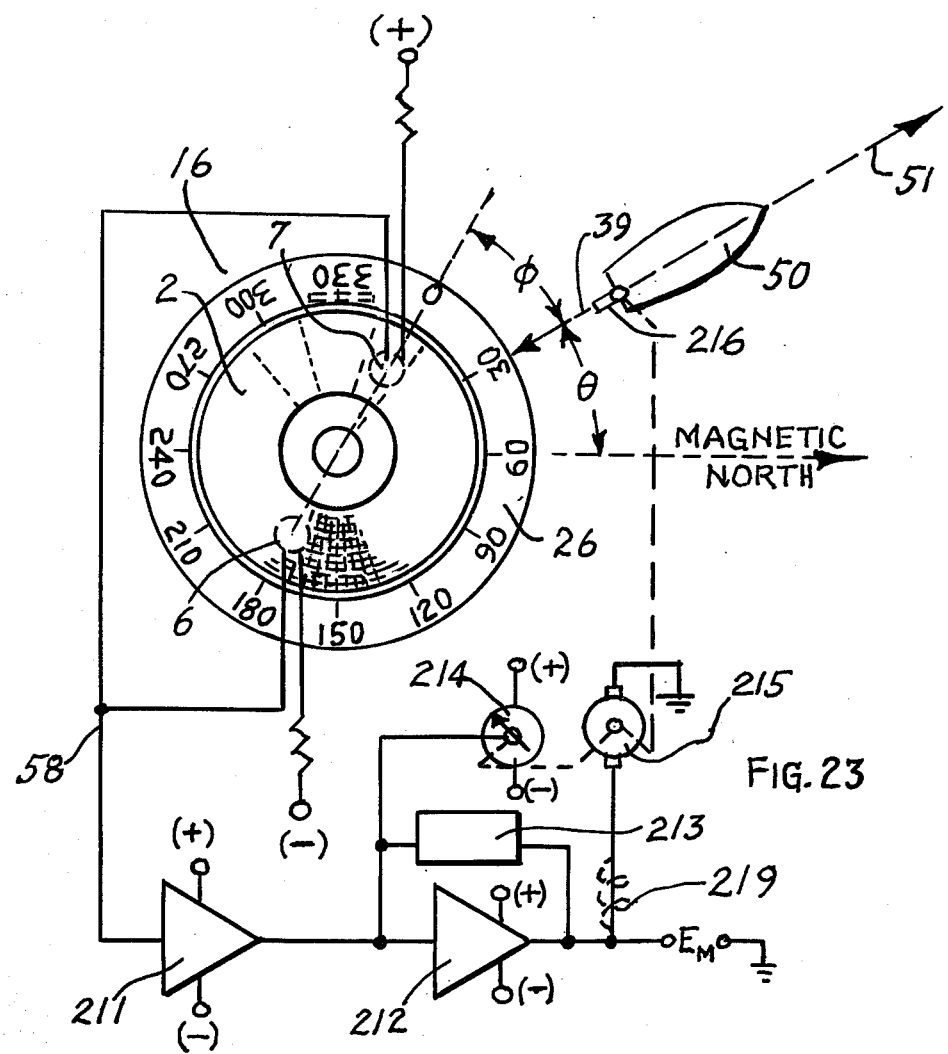

FIG. 23 is a block diagram of an automatic pilot system utilizing the sine signal for course correction.

Figure 24:
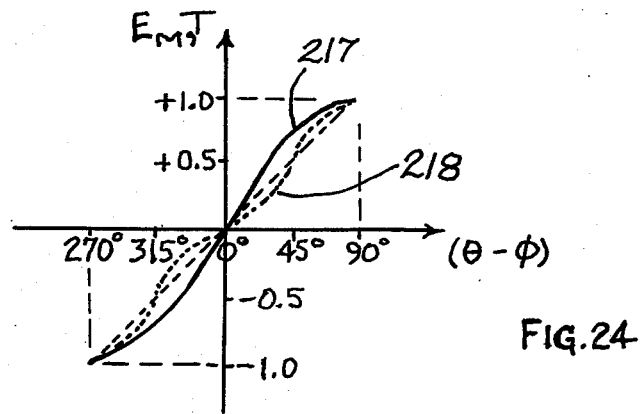

FIG. 24 shows the output torque-versus-angle curve of the automatic pilot system.

The basic feature of the pattern 2 on the bottom of the compass card 1 in the oil filled compass 16 of FIG. 1 is the relation between the black density D and the angle $\theta$ as given by the equation $$D = K\cos^2(\theta/2)$$

(viewed from underneath)

$\theta$ is referenced to the darkest portion of the pattern. D is further defined as the decimal fraction of black area in a unit area, and K is a constant of proportionality. The density along a radial line is assumed constant, in the simplest embodiment of the invention, though a controlled variation radially may be utilized for tilt compensation, as will be explained in more detail later.

Two sensors 4 and 5, placed 180° apart as in FIG. 1, view areas 6 and 7 of the pattern through the transparent lower bowl 13, when the card 1, to which magnets 31 and 32 are attached, points in the direction indicated. the optics 23 involved for each sensor are shown in FIG. 15 where the circular pattern area 6 is imaged on the surface of sensor 4 by lenses 17 and 18. Similarly, another pair of sensors 35 and 37, shown in FIGS. 5 and 6, at right angles to first pair, view areas 8 and 9. FIG. 8 shows the circuit containing the two pairs of sensors. The compass is assumed attached to the craft so that the centerline or lubber line of the craft is parallel to sensors 4 and 5. Then when the craft swings to an angle $\theta$ with respect to Magnetic North the voltage output of sensors 4 and 5 will be $$E_1 = KA \cos^2 \frac{(\theta - 90°)}{2} - \cos^2 \frac{(\theta - 270°)}{2}$$

$$= KA_1 \cos(\theta - 90°)$$
$$= KA_1 \sin \theta, \quad A_1 \text{ being a constant of proportionality.}$$

Figure 2:
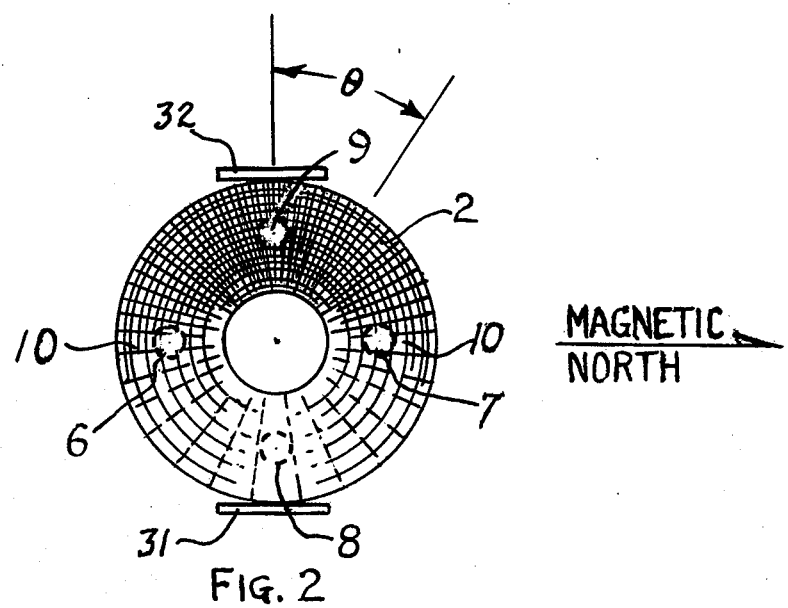
FIG. 2 shows the card with its variable density pattern.

Similarly, the second pair of sensors viewing areas 8 and 9 of FIG. 2 will have an output $$E_2 = KA_2 \cos^2 \frac{\theta}{2} - \cos^2 \frac{(\theta - 180°)}{2}$$

$$= KA_2 \cos \theta, \quad A_2 \text{ being a constant of proportionality.}$$

The relation expressed for the density D may be further amplified as $$D = K\cos^2(\theta/2) = (K/2) + (K\cos\theta/2)$$

If the output of one sensor of a pair is linearly related to density D, then the output $E_2'$ of the 180° opposite sensor is $$E'_2 = (K'/2) - (K'\cos\theta/2)$$

and since the outputs are used in opposition, the constant term may be changed to include general diffuse illumination and other constant surface effects, so that we may use $$E_1' = K_1' + K_2'\cos\theta$$

and $$E_2' = K_1' - K_2'\cos\theta, \quad E_0' = E_1' - E_2',$$

and the constant terms cancel out, leaving $$E'_o = 2K'_2 \cos\theta$$

Thus with a novel and simple means the sine and cosine vector components of the compass card angle $\theta$ are obtained. Quadrant ambiguity of either sine or cosine is avoided because their relative algebraic signs are unique for each quadrant.

In FIG. 2 sensor-viewed areas 6 and 7 are equal in density hence the output of this pair of sensors is zero, $\theta$ being zero. Sensor-viewed areas 8 and 9 on the other hand yield maximum differential output voltage for $\theta$ equal to zero.

When the craft pitches and rolls, and card will remain roughly horizontal while the sensors move with the craft and the areas viewed by the sensors will move slightly in and out radially and the reflection angles between source and sensors will change. It is desirable therefore to roughen the surface of the pattern to minimize specular reflection and to increase diffusion and also to "dish" or shape it as indicated in FIGS. 1 and 4 so as to reflect approximately equal light intensity at all angles of tilt. Approximately 15° of tilt can be compensated in this manner. Larger degrees of tilt require internal gimballing, with optics and sensors inside of the compass bowl, as shown in FIGS. 20 and 22.

Another means which may be employed for tilt compensation is controlled radial variation of pattern density. With a constant radial pattern density, data relating output voltage change to tilt angle may be taken and used to make corresponding corrections in radial density to compensate therefore, by "dotting" or marking the pattern with suitable dye or paint, or by abrasive action on the pattern. Once the corrections are known, a relatively simple alteration of the master pattern from which the compass patterns are made is involved.

The pattern may be made by photoetching anodized aluminum sheet, by photo-engraving, by printing on bare aluminum, or by any other well-known commercial process.

Referring to FIG. 3, two dual sensors and appropriate optics may be used to view area pair 6A and 7A, and area pair 8A and 9A of split pattern 2A in which two halves of the pattern are displaced 180° with respect to each other. In this case the pattern section appears as in FIG. 4, dished for optimum tilt compensation. The optics involved are shown in FIG. 16 where the lens combination 17 and 18 and apertures 194 and 196 combine to focus rectangular areas 6B and 7B on to the surface of dual sensor 197.

With both types of pattern and sensors, Card 1 is shown as formed with an apron. This apron, combined with black coatings 11 and 12 of FIG. 1, which extend a short distance above and below the joint between the upper and lower transparent bowls 14 and 13 and which extend completely around the bowls, form a stray light shield which adequately protects the interior of the bowl and the sensors from direct sunlight or other local light sources.

The single sensors 4 and 5 and 35 and 37 of FIGS. 5 and 6 are shown mounted in holders 22, 23, 24 and 25 on a rotatable ring 26 which shall be designated as the desired heading ring. FIG. 6 is a top view of the sensors and ring. Since power must be brought in to lamp 3 and sensor signals must be brought out, flexible cable 29 is so arranged that slightly over 360° of ring rotation is accommodated by stop 33 and swinging arm stop 34.

Lamp housing 27 and lamp holder 28 rotate with ring 26 and permit through threading of circuit leads to the sensors. A translucent diffusor 15, shown both in FIG. 1 and FIG. 6, is utilized to improve uniformity of illumination of the pattern.

Opening 36 in the compass housing permits viewing the fixed reference line 39 and one or two angle numbers and also allows manual turning of the ring 26, the edge of the ring being knurled or scalloped for this purpose.

A typical section of optics holders 22, 23, 24 and 25 is shown in FIG. 15, as previously described.

The operation of the compass, desired heading ring, and optics system can be understood by reference to FIG. 7. Assume that the craft is cruising on a 330° course as shown, and that the desired heading ring had been placed on 0° or Magnetic North. This means that a left or port error angle $\theta$ of 30° is being steered. Since sensors 4 and 5 view pattern areas 6 and 7, and sensors 35 and 37 view pattern areas 9 and 8, a top view being shown, the resistance of sine sensor 5 will be less than that of sine sensor 4 because it receives more light, therefore the potential of common connection 58 moves from zero toward the supply voltage feeding sensor 5. From FIG. 8 this is seen to be negative. Thus port steering error negative output voltage increases up to 90° angle and then decreases to zero at 180°. Conversely, right or starboard steering angle errors produce positive output voltage, becoming maximum at 90° and decreasing to zero at 180°. The cosine channel consisting of sensors 35 and 37 will have a common connection 57 output voltage maximum positive at $\theta = 0°$, decreasing to zero at $\theta = 90°$ and 270° and increasing to maximum negative for $\theta = 180°$.

The sine signal line 58 is fed to an isolation amplifier 42 and thence to the off-course steering angle display meter 41. The sine signal is used without modification intentionally for error angle indication although it is non-linear with respect to angle for the reason that angles close to zero are more useful for steering accurately than angles near 90°, thus the meter 41 scale is expanded near zero and is compressed near 90°, if shown at all above 60°.

A hull water-spaced transducer 43 output voltage is multiplied in multiplier 44 with the sine signal on line 58 to yield a velocity error signal to sine integrator-amplifier 46. Since the time integral of velocity is equal to distance traversed, the output of 46 is displayed directly on off-course distance display meter 49. Reset switch 119 permits zeroing of the distance voltage accumulated in integrator 46 at the chosen starting point and time.

Similarly the voltage at the common connection 57 of the cosine sensors, and the water speed voltage signal of transducer 43 are multiplied in multiplier 45 whose output voltage is integrated in cosine integrator-amplifier 47, the output of which drives the on-course distance display meter 48. FIG. 8 shows some of the circuit details pertaining to the block diagram of FIG. 7.

On the actual course being steered in FIG. 7, a negative or port off-course steering angle of 30° will be displayed, and a build-up of port off-course distance will occur, as well as a continuing build-up of on-course distance, since the cosine of 30° is not far from positive unity.

Sensors 4 and 5 and resistors 55 and 56 of FIG. 8 form a bridge balanced between the positive and negative supply voltages when sensors 4 and 5 are equally illuminated, and the voltage swings from zero as $\theta$ changes from zero as previously described. Likewise in the cosine channel sensors 35 and 37 and resistors 53 and 54 form a bridge balanced when the sensors view equal pattern density at $\theta = 90°$ and $270°$ and the voltage on common line 57 is zero, swinging to maximum positive at $\theta = 0°$ and maximum negative at $\theta = 180°$ as previously described.

The water speed transducer 43 in FIG. 8 drives a one-shot multivibrator 59 which feeds uniformly shaped pulses to the sine multiplier 44 and cosine multiplier 45, the other inputs being lines 58 and 57 respectively. The output of the sine multiplier 44 is proportional to velocity off-course and is fed through resistor 62 to sine integrator 46A.

The multipliers and integrators are commercially available integrated circuits such as the Signetics 5595 and the Analog Devices AD540J, respectively, the latter having extremely low input leakage current of the order of $10^{-11}$ amperes so that the capacitors 60 and 61 will fully retain their charge for many hours, the range of capacity being 8 to 100 microfarads with very high leakage resistance, of the order of $10^{12}$ ohms.

From the sine integrator 46A, the voltage is fed to the off-course meter amplifier 46B and thence to the off-course distance meter 49. Range switches may be included, changing meter shunts to vary peak indicated distance, if desired.

Sine signal line 58 also drives the isolation amplifier 42 which feeds the off-course angle display meter 41.

Cosine signal line 57 similarly feeds the cosine multiplier 45 which drives the cosine integrator 47A which drives the on-course meter amplifier 47B which has the on-course distance meter 48 in its output.

The distance displays are set to zero at the chosen starting time and place by means of normally open grounding switch 119.

FIG. 9 shows the angular relations between the craft's lubber line 51, the compass card 1, Magnetic North, the desired heading ring 26, and the sensor-viewed areas 6, 7, 8 and 9, for the compass of FIGS. 5 and 6 in which the sensor holders and optics are mounted on a rotatable ring. In the case shown, in which the card and ring are viewed from above, the craft 50 is heading on a 30° course, which by the convention previously chosen is a positive angle, while the desired heading ring angle $\phi$ has been set to 300° which is equivalent to a negative 60° angle, which means that the steering error is $(\theta - \phi)$ or $-90°$ to starboard. Maximum positive error angle will be indicated and positive or starboard off-course distance will be accumulated at a maximum rate, and zero on-course distance will be accumulated, while on this course.

FIG. 10 shows a system in which the sensors are fixed in the compass, while the desired heading ring or dial 26 has been located on the display panel. This requires the incorporation of sine-cosine potentiometers 68 and 69 in order to automatically perform the analog computation of sin $(\theta - \phi)$, and cosine $(\theta - \phi)$.

The compass sensor outputs are sin $\theta$ on line 80, and cos $\theta$ on line 78. A pair of slip rings in each potentiometer is used to bring out the modified signals. The sin $\theta$ signal derived from sensors 4 and 5 is applied directly to the top of potentiometer element 69 and to inverter 87, where its sign is reversed and applied on line 81 to the bottom of element 69. The potentiometer resistance has a sinusoidal taper with respect to angle, as is well known in the servo and synchro art.

From the trigonometric relations $$\cos (\theta - \phi) = \cos \theta \cos \phi + \sin \theta \sin \phi$$

and $$\sin (\theta - \phi) = \sin \theta \cos \phi - \cos \theta \sin \phi$$

and from the resistance tapers on 68 and 69, wipers 74 and 75 being oriented at 90° with each other, it is seen that the outputs from slip ring contacts 76 and 77 will be sin $\theta$ cos $\phi$ and sin $\theta$ sin $\phi$ on lines 84 and 85, respectively.

Similarly application of signals $+$ cos $\theta$ and $-$ cos $\theta$ to potentiometer element 68 will result in signals cos $\theta$ sin $\phi$ and cos $\theta$ cos $\phi$ on lines 83 and 82, respectively. Addition of the signals in integrated circuits 88 and 89 yields cos $(\theta - \phi)$, while subtraction of signals in integrated circuits 90 and 91 yields sin $(\theta - \phi)$. These are the signals which are then multiplied by water speed to give on-course velocity and off-course velocity, respectively, these velocities then being integrated to yield accumulated on-course and off-course distances, as in FIGS. 7 and 8.

FIG. 11 illustrates the application of the previously described compass as in FIG. 1 to a remote indicating compass system. The compass voltage outputs, Asin $\theta$ and Acos $\theta$ are isolated in unity-gain amplifiers 99 and 100, and are then current-amplified in amplifiers 103 and 104, with current outputs Csin $\theta$ and Ccos $\theta$ respectively, A, B and C being constants of proportionality. These currents in sine coils 105 and 106, and in cosine coils 107 and 108, create quadrature magnetic fields with whose vector sum the permanent magnet rotor 109 aligns itself. The dial 112 being attached to the rotor shaft 111 then indicates the magnetic heading of the craft by means of the fixed index 113, as is well known in the synchro and servo art.

In FIGS. 12 and 13, a system is shown which utilizes the compass signals described and the display panel desired heading dial 26, and which incorporates the feature of insertion of an estimated drift vector into the analog computation of the craft's coordinates, the drift being caused by tide or current, or wind abeam.

Meshed with the desired heading dial 26 by one-to-one gearing 134 and 135 the sine-cosine potentiometer 128 rotates in the opposite direction, with the drift direction dial 127 being fixed to the display panel 157. The manually rotatable knob 148 is restrained from turning with rotation of the desired heading ring 26 by friction spring 155, and may be set to the estimated drift direction angle $\psi$ independently of the desired heading setting $\phi$. The estimated drift speed is set on potentiometer dial 122 by manually settable knob 150. Potentiometer 123 may have a linear resistance taper. The d.c. voltage output of potentiometer 123 is converted to a corresponding frequency by voltage-to-frequency converter 120 which controls a one-shot multivibrator connected by line 143 to multipliers 125 and 126. The quadrature outputs of drift direction potentiometer 128 on lines 129 and 130, being proportional to sin $(\phi-\psi)$ and to cos $(\phi-\psi)$, are multiplied by the drift speed signal on line 143 in multipliers 125 and 126 giving as a result off-course and on-course drift velocity pulsed signals on lines 145 and 144, respectively, these signals going in parallel with the water speed pulsed signals Ssin $(\theta-\phi)$ and Scos $(\theta-\phi)$ on lines 138 and 136, respectively, into integrators 46 and 47, which accumulate total off-course and on-course distances which are displayed on meters 49 and 48, respectively. The integrators perform the function of adding distance increments due to both speed through the water and due to estimated movement of the water itself, which may for most locations be obtained from tables such as for instance, Eldridge "Tide and Pilot Book" published by R. E. White, Boston, Mass.

An off-course alarm system, utilizing the integrated off-course signal on line 184 of FIG. 7, is shown in FIG. 14. This system is manually settable to trigger at any desired off-course distance by potentiometer 192. Non-inverting amplifier 185 has in its output diode 188 so that it will drive alarm transistor 190 into conduction only on negative or port errors while inverting amplifier 186, with diode 189 in its output, drives alarm transistor 190 into conduction only on positive or starboard course errors. The alarm 191 may be a commercially available type such as the "Sonalert".

FIGS. 15, 16 and 17 illustrate the optics elements which may be used in the systems described herein. FIG. 15 shows the two lenses 17 and 18, sensor and lens holder 23 and sensor 4. This system, with a circular stop 198 images the portion 6 shown dashed or the card pattern 2 on to the surface of the sensor 4. Four such lens and sensor optics elements are used in the systems of FIGS. 1, 5, 7, 8, 10, 11 and 12. FIG. 16 shows the two-lens, four-aperture, dual sensor optics utilized in the navigational system of FIG. 3, with the split pattern 2A. Dual aperture plate 196 masks the dual sensor 197 so that aperture plate 194 and divider 195 permit light to fall on the correct areas of the sensor surface from areas 6B and 7B imaged by lenses 17 and 18. The apertures of plate 194 are imaged in reverse order on the pattern 2A.

The advantage of this system is that the dual sensors 197 are on the same substrate and therefore should "track" or follow the same temperature-resistance curve and the same illumination-resistance curve. The disadvantage is that tilt compensation is much more difficult. FIG. 17 shows the lens-less, aperture-only optics which may be utilized in an internally gimballed compass in which the sensors are placed inside the bowl close to the compass card and density pattern. The sensor wires must then be brought out along the gimbal axes, and through the lower bowl.

A system which uses a density pattern in a transmissive mode, rather than in a reflective mode as previously described, is illustrated in FIGS. 18 through 22. A developed view of the pattern 158 is shown in FIG. 18. The pattern may consist of photoetched metal thick enough to be self-suppporting and yet bendable so as to form a cone as in FIG. 19, or it may be a pattern printed on a translucent plastic such as semi-matte Mylar, or may be photoetched thin metal laminated on any plastic such as Mylar which is compatible with compass oil.

FIG. 18 illustrates a convenient type of pattern construction as a constant size orthogonal line mesh with variable line width. Along any one radius such as 159 the line width is constant, the equation for line width at an angle $\theta$ being:

Width W as a decimal fraction of mesh width:

$$W = \frac{1}{2}(1 - \sqrt{D'}) = \frac{1}{2}(1 - M\sin\frac{\phi}{2})$$

where
$D'$ = Fractional black density = $M^2\sin^2(\theta/2)$ and
$M = 1 - \left(\frac{\text{Minimum line width}}{\text{Mesh width}}\right)$ The pattern may be laid out conveniently at about eight times scale and then photo-reduced to size.

In addition to the controlling pattern 158, a trimming cone 163 is shown in FIGS. 20 and 22. This cone consists of translucent plastic such as semi-matte Mylar. Its purpose will become evident in the following description.

Two sensors 5 and 37 are mounted so that their centers are on the same horizontal line as the lamp 3 as shown in FIGS. 20 and 21, and with the centerline of the pattern cone 158. Sensor 5 will arbitrarily be chosen as the reference sine signal sensor, and sensor 37 will thus become the reference cosine signal sensor. The light intensity falling on them is controlled directly by the cone pattern 158. Fixed diffusion may be added with translucent plastic panels 176 and 177, so that shadow patterns of the cone falling on the sensors is diffused sufficiently so that the sensor output voltage curve is monotonic.

Sensors 4 and 35 are the trimmable sensors, sensor 4 being the sine member and sensor 35 being the cosine member of the pairs. Trimming is accomplished by alteration of the light transmission of the cone 163. In the case of a semi-matte Mylar plastic cone both negative and positive changes in transmission may be made. Negative changes are most conveniently made by small dot application of lacquer such as TEMPO Flat Black Lacquer 9-24 Spec. TT-L-20 which has excellent adhesion, while positive changes are made by localized scraping of the matte outside cone surface with an Exacto blade. This method of trimming is useful not only for compensating for non-linearity and non-tracking of the sensors of a pair, but also for compensating for tilt of the card 1A with respect to the gimballed tray 178. It will be noted that cosine sensor 35 is mounted above the pattern centerline 179 whereas the sine trimming sensor 4 is mounted below the centerline. By this means separate trimming zones on the cone 163 are available at all angles $\theta$ and within tilt angle limits of plus or minus 7.5°.

In the partially cut-away view of FIG. 21 it will be noted that the image 1B of the actual compass card 1A is enlarged by the compass oil contained in the transparent upper bowl. The dashed circle 202 shows the actual outside diameter of the card 1A.

Stray light proofing of this compass is accomplished by circular or conical opaque barrier 220 as well as by opaque layers on the upper bowl similar to layers 11 and 12 of FIG. 1, the lower bowl being opaque in this case.

In rough navigational conditions the card 1A may tilt plus or minus 5° with respect to the tray 178, which is gimballed on pivots 173, 172, 206 and 207. In FIGS. 20 and 22, plus or minus 7.5° of tilt is permitted. This is not a limiting condition, as relative cone and card dimensions may be changed for greater tilt without departing from the teachings and the spirit of the invention.

As a practical matter concerning maintenance of accuracy, a lamp regulator sensor 208 is included in the system. The circuit leads from this sensor as well as the other sensors and from the lamp 3 are brought out along the gimbal axis as very finely stranded Litz wire, the lamp leads being for instance 7 strands of #41 wire while the sensor leads may be 9 strands of #43 wire. The leads may have loops at the gimbals so as to exert extremely low torque on the tray.

The pattern 158 has the same density relation with respect to angle $\theta$ as the pattern 2 of FIG. 1, and as a practical matter has its ends joined at the maximum black region 162. The angle $\theta$ is then measured from the joint line 160. If the cone is metal and self-supporting which is possible for 0.006 inch thick copper, the minimum line width is 0.006 inch in the minimum density region, and in the equations $$D_1 = K_1 + K_2 \cos \theta$$

and $$D_2 = K_1 - K_2 \cos \theta,$$

previously given, $$K_1 + K_2 = 1.0,$$

but $K_2 < 0.5$ because of the minimum line width restriction. As pointed out previously, however, this does not affect the output curve shape and $$E_0 = 2K_2 \cos \theta,$$

only the peak amplitude being affected, which can be compensated elsewhere in the system. Thus in operation, both the transmissive system of FIGS. 20 and 21 and the reflective system of FIG. 1 operate on the same basic principle.

FIG. 22 shows the means employed to compensate fully for tilt along the sensor pair axis. The cones 158 and 163 are bowed with a radius of curvature referenced to the card 1A and cone assembly pivot point 165, so that at all angles of tilt the separation of the cones and sensors remain constant, and since on any vertical pattern line the pattern line width is constant, the illumination intensities at the sensors remain constant. For tilt at right angles to the line joining any sensor pair it can be shown that since the relative motion of both sensors with respect to the pattern is in the same direction for such tilt, the changes in output very nearly cancel, and a worst case output error of less than 0.25° results with 5° tilt.

In all of the foregoing description, while the craft involved has been shown as a marine vessel, it is to be understood that the systems described are equally applicable to aircraft navigation. In fact, the drift vector in the system illustrated by FIGS. 12 and 13 becomes the wind vector.

FIG. 23 pertains to the application of the compass of FIG. 5 to an automatic pilot system. In such systems it is customary to provide for no more than 90° of course correction, since it is the main purpose of the system to keep the craft closely on course, therefore the cosine pair of sensors may be omitted unless it is desired to retain them for alarm purposes in case of accidental course reversal.

The sine signal output on line 58, if utilized with a predetermined torque characteristic of motor 215 is advantageous from the standpoint of anti-hunting of the servo loop. The entire system consisting of the compass 16, the amplifiers 211 and 212, the motor 215 and rudder 216, as well as the local feedback loop containing the electrical impedance 213 and the motor shaft potentiometer 214 will oscillate or hunt if the torque-voltage curve is steep at zero error angle. It is desirable therefore to use a motor such as a series type with the field 219 in series with the armature, or with a magnetic structure such that the output torque is proportioned roughly to the square of the applied voltage. With a sine error signal such as curve 217 of FIG. 24 this will result in a torque-angle curve such as 218 which has zero or nearly zero slope at zero error angle. As a result, the required electro-mechanical damping to prevent hunting will be greatly reduced, and the usable power output will be increased for a given input.

While preferred embodiments of the invention have been set forth for purposes of disclosure, modification to the disclosed embodiments thereof may occur to those skilled in the art. Accordingly, the appended claims are intended to cover all embodiments which do not depart from the spirit and scope of the invention.

What is claimed is:

1. Means for obtaining voltages proportional to the sine and cosine of the angle between the zero angle reference line on a rotatable card or dial and a fixed external reference line, said means consisting of a prescribed variable density optical pattern on the card or dial, said pattern having an angular density relation expressed by the equation $$D = K\cos^2(\theta/2) = (K/2)(1+\cos\theta)$$

where K is a constant of proportionality and $\theta$ is the angle referenced to the darkest density angle, a light source illuminating the card or dial, orthogonal pairs of photo-sensors connected in circuit so as to balance out constant voltages due to diffuse or background illumination or unavoidable minimum pattern density and yielding output voltages proportional to the sine and cosine of the above said angle.

2. Means of claim 1 in which the angular density relation expressed by the equation $$D = (K/2)(1 + \cos\theta) = (K/2) + (K/2)\cos\theta,$$

of claim 1 is modified to include the case in which the constant term is greater than the coefficient of the cosine term, namely $$D = K_1 + K_2 \cos\theta,$$

where $K_1$ is greater $K_2$, $(K_1 + K_2)$ being equal to or less than unity, corresponding to conditions in which the density does not vary from full white (D = 0) to maximum dark (D = K) as in claim 1, but varies from light grey $(D = K_1 - K_2)$ to dark grey $(D = K_1 + K_2)$, a light source illuminating the card or dial, orthogonal pairs of photo-sensors connected in circuit so as to balance out the constant $K_1$ terms, and yield outputs proportional only to $K_2 \cos\theta$ and $K_2 \sin\theta$.

3. Means of claim 2 in which the optical pattern is split radially into two circular patterns shifted 180° C. with respect to each other and means consisting of two dual photo-sensors focussed on said patterns at areas 90° C. apart, one element of each dual sensor being focussed on the inner pattern, the other being focussed on the outer pattern.

4. Means of claim 2 in which the surface on which the pattern is imprinted or etched in sandblasted or otherwise roughened so as to diffuse the reflected light.

5. Means of claim 4 in which the surface on which the pattern is imprinted or etched is shaped so as to reflect constant light intensity at a given angle to the surface for all angles of tilt up to plus or minus 15 degrees of the pattern with respect to the plane containing the sensors.

6. A navigational device consisting of a magnetic compass containing the means of claim 2, the fixed external reference line being the centerline of the craft being navigated and the zero angle reference line on the rotatable card being North or zero degrees, the card bearing magnets fixed on a North-South line, said means resulting in output signals proportional to the sine and cosine of the angle between the centerline or lubber line of the craft and Magnetic North, the sine signal being displayed as a steering angle purposely expanded near zero angle and compressed near 90°.

7. A modification of the device of claim 6 in which the pairs of sensors are mounted on a rotatable ring or desired heading dial so that the sensor pair outputs become proportional to the sine and cosine of the angle between the desired heading and the craft's actual heading with respect to Magnetic North.

8. Analog computing means consisting of the means of claim 7, a craft air or water speed transducer and pulse shaping circuit, multipliers for obtaining the products of the shaped speed signal and the sine and cosine signals, integrators to obtain the time integral of these products, meter amplifiers and meters to display the integrals which become the off-course and on-course distances traversed by the craft, with respect to the desired heading and the selected starting point assuming zero air or water speed, a meter amplifier and meter to display the sine signal as a steering error angle and a reset switch to reduce the integrator outputs to zero at the starting point.

9. Means of claim 8 to which additional means are added to provide for insertion of an estimated drift vector into the analog computation in order to account for effects of wind or current.

10. Means of claim 8 in which the integral of the sine-speed multiplied signal is used to trigger an alarm at a predetermined accumulated off-course distance.

11. Means of claim 7 in which the compass sine signal is used to actuate an automatic pilot for course correction.

12. Means of claim 11 in which the compass sine signal actuates autopilot amplifiers and a rudder motor or actuator having an overall torque-angle curve proportional or nearly proportional to the square of the sine signal input.

13. Means of claim 6 in which the sensors are fixed in the compass, the desired heading dial being on the display panel and operating in conjunction with a pair of sine-cosine potentiometers, adding and subtracting circuits to yield output signals proportional to the sine and cosine of the angle between the desired heading and the craft's actual heading with respect to Magnetic North, a speed transducer and pulse shaping circuit, multipliers for obtaining the products of the shaped speed signal and the sine and cosine signals from the potentiometers, integrators for obtaining the time integrals of said products, and amplifiers and meters for displaying said integrals which are the off-course and on-course distances traversed by the craft, a meter amplifier and meter to display the sine signal as a steering error angle, and a reset switch for zeroing the integrators at the selected starting points.

14. Means of claim 13 to which additional means are added to provide for insertion of an estimated drift vector into the analog computation in order to account for effects of wind or current, said additional means consisting of a coaxial pair of sine-cosine potentiometers with a common shaft manually settable to an estimated drift angle with respect to Magnetic North, the sine-cosine potentiometer resistance bodies being driven by the desired heading dial, said common shaft being restrained from moving with the desired heading dial, circuit means to multiply the outputs of said potentiometers with the drift speed signal to obtain drift vector velocity component signals which are added to the off-course and on-course integrators of the apparatus of claim 13 to yield total integrated off-course and on-course distances traversed.

15. Means of claim 13 in which the integral of the sine-speed multiplied signal is used to trigger an alarm at a predetermined accumulated off-course distance.

16. Means of claim 6 in which the sine and cosine signals are used with means for driving a remote indicating dial which displays the heading of the craft with respect to Magnetic North.

17. Means of claim 6 in which stray light proofing is accomplished by forming the compass card with an apron and by coating a portion of the compass bowls, said coatings having a width such as not to interfere with visual reading of the card.

18. Means of claim 2 in which the pattern consists of a self-supporting cylinder or cone, operating in a light transmissive mode, interposed between the illumination source and the sensors.

19. Means of claim 18 in which an additional transmissive cone is interposed between the pattern and one sensor of each pair of sensors, the second cone being utilized for angular trimming of the output of each pair of sensors, to offset sensor non-linearity, errors of tracking of each of the sensors of a pair of sensors with respect to illumination level, tilt errors, and non-uniform angular distribution of illumination.

20. Means of claim 19 in which additional diffusion means are interposed to balance the average illumination diffusion and intensity at each sensor of a pair of sensors.

21. Means of claim 19 in which the light transmissive cones are shaped with a radius of curvature having its center at the compass card and pattern pivot point, such that the distance from the cones to sensors remains constant at all angles of tilt of the pattern with respect to the sensors.

22. Means of claim 18 in which the pattern consists of a self-supporting cylinder or cone, operating in a light transmissive mode, interposed between the illumination source and the sensors, the sensors being fixed angularly in the compass, the desired heading dial being on the display panel and operating in the conjunction with a pair of sine-cosine potentiometers, adding and subtracting circuits to yield output signals proportional to the sine and cosine of the angle between the desired heading and the craft's actual heading with respect to Magnetic North, a speed transducer and pulse shaping circuit, multipliers for obtaining the products of the shaped speed signal and the sine and cosine signals from the potentiometers, integrators for obtaining the time integrals of said products, amplifiers and meters for displaying said integrals which are the off-course and on-course distances traversed by the craft, a meter amplifier and meter to display the sine signal as a steering error angle, and a reset switch for zeroing the integrators at the starting point.

23. Means of claim 22 to which additional means are added to provide for insertion of estimated drift vector components into the total integrated off-course and on-course distances traversed, said additional means consisting of a coaxial pair of sine-cosine potentiometers with a common shaft manually settable to an estimated drift angle with respect to Magnetic North, the sine-cosine potentiometer resistance bodies being driven by the desired heading dial, said common shaft being restrained from moving with the desired heading dial, circuit means to multiply the outputs of said potentiometers with the drift speed signal to obtain drift vector velocity component signals which are added to the input signals of the off-course and on-course craft water speed signal integrators to yield total integrated off-course and on-course distances traversed.

* * * * *